Patented June 13, 1939

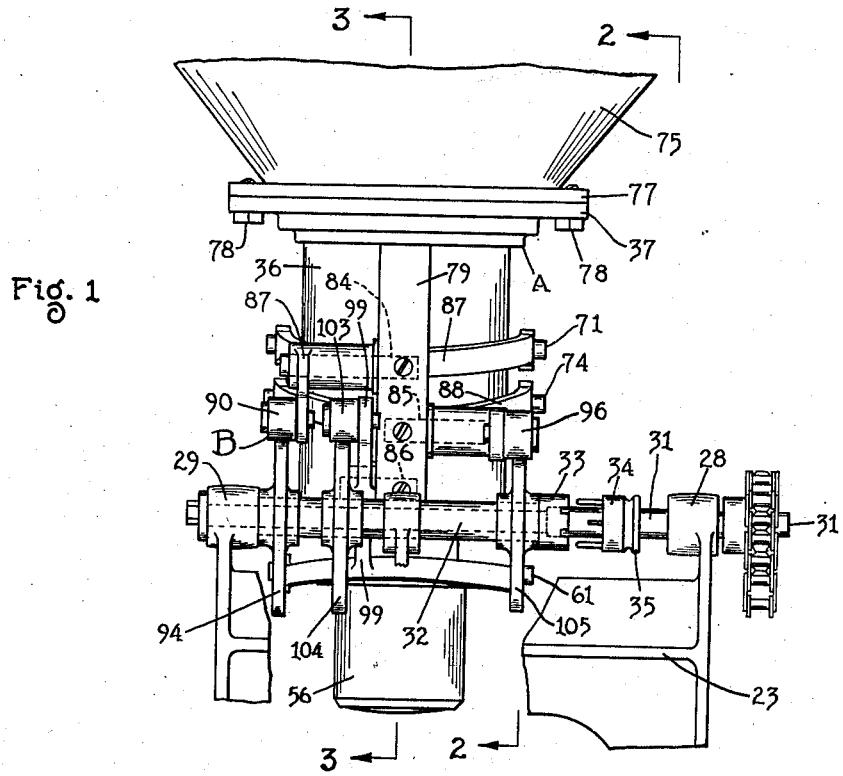
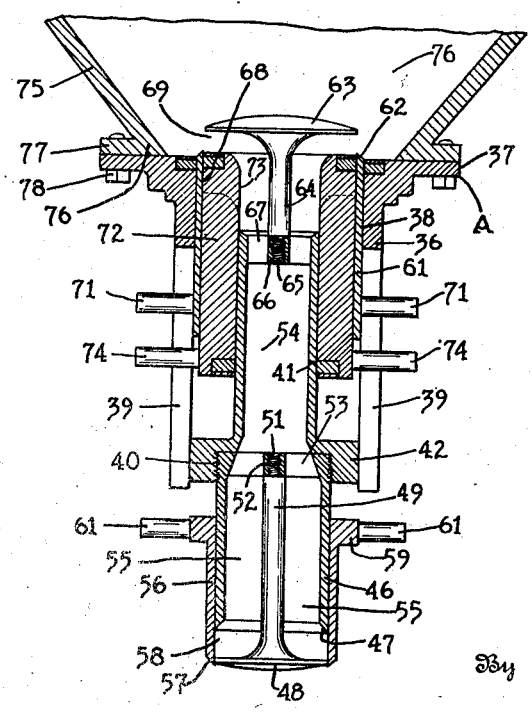

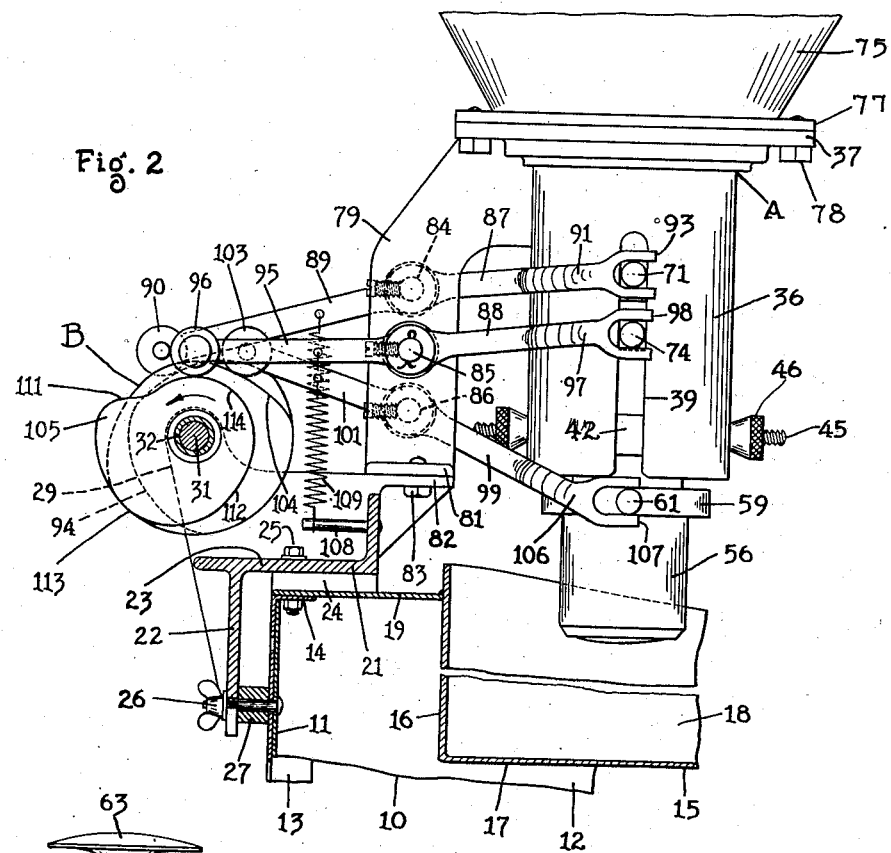
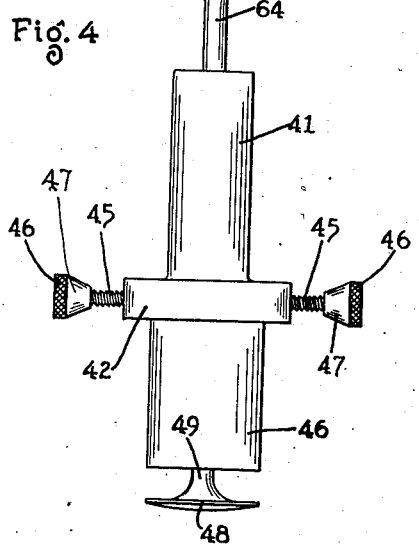
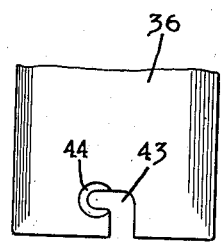
Inventor
Alexander S. T. Lagaard

2,162,557

UNITED STATES PATENT OFFICE 2,162,557

DOUGH CUTTER

Alexander S. T. Lagaard, Minneapolis, Minn., assignor to Dough-King, Inc., Minneapolis, Minn., a corporation of Minnesota Application March 4, 1938, Serial No. 193,897

10 Claims. (Cl. 107—14)

My invention relates to dough cutters and particularly to cutters used for cutting annular formations of dough, such as doughnuts and the like.

An object of the invention resides in providing a dough cutter which will be simple in construction and positive in operation.

Another object of the invention resides in providing a dough cutter in which accurately measured quantities of dough can be repeatedly severed from the mass of dough.

A still further object of the invention resides in providing a cutter which can be easily and quickly assembled and disassembled.

Another object of the invention resides in providing a dough cutter utilizing a cylinder, an inlet valve mechanism communicating therewith and an outlet valve mechanism for controlling the extrusion of dough from the cylinder.

A feature of the invention resides in providing a dough cutter in which the dough travels the shortest possible distance in moving from the mass to the cylinder and in which the travel of the dough throughout such movement is entirely unobstructed.

Another object of the invention resides in providing a dough cutter in which the inlet valve can be conveniently constructed with a relatively large inlet opening.

A feature of the invention resides in constructing the inlet valve mechanism so as to displace as little dough as possible in the closing of the same.

An object of the invention resides in providing a dough cutter in which the piston and inlet valve mechanism may be easily and conveniently removed from the cylinder as a unit.

Another object of the invention resides in attaching the supporting structure of both valve mechanisms to the cylinder at a locality intermediate the ends of the valve mechanism so that no obstructions exist at the valve mechanisms whereby the dough may enter into and be discharged from the cutter with a minimum amount of resistance.

A feature of the invention resides in providing a tube concentrically arranged with respect to the cylinder and having a portion intermediate its length, centered by said cylinder or a part thereof concentric therewith.

An object of the invention resides in attaching to the upper end of said tube a portion of the inlet valve mechanism and to the lower end of said tube a portion of the outlet valve mechanism.

An object of the invention resides in utilizing an annular piston and in slidably mounting said piston upon said tube.

A feature of the invention resides in utilizing a sleeve valve for a part of the inlet valve mechanism and mounting the sleeve thereof for reciprocation upon said annular piston.

Other objects of the invention reside in the novel combination and arrangement of parts and in the details of construction hereinafter illustrated and/or described.

In the drawings:

Fig. 1 is an elevational view of a portion of a doughnut machine illustrating an embodiment of my invention applied thereto.

Fig. 2 is an elevational sectional view taken on line 2—2 of Fig. 1.

Fig. 3 is a longitudinal sectional view taken on line 3—3 of Fig. 1.

Fig. 4 is an elevational view of the supporting tube of the invention detached from the cutter.

Fig. 5 is a fragmentary elevational view of a portion of the cylinder of the cutter with the interior construction removed therefrom.

My invention resides in a dough cutter which may be applied to any type of doughnut machine. This cutter is particularly applicable to a machine such as shown in the copending application of Peter J. Toews, Serial Number 114,395, filed December 5, 1936 for Doughnut machines. Since this invention is directly associated with a portion only of the structure shown in said application, so much thereof as will be needed to describe the present invention will be shown, reference being had to the said application for patent for further details of the remainder of the doughnut machine.

The doughnut machine, with which the invention is illustrated, comprises a case 10 which is constructed with a rear wall 11, side walls 12 and a front wall, not shown. These walls are attached to angle iron legs 13, one of which is shown in Fig. 2. The upper ends of these walls have secured to them angle iron frame members, the member attached to wall 11 being indicated by the reference numeral 14. Supported in the case 10 is a pan 15, which is constructed with vertical walls 16 and a bottom 17 which form a way 18 along which the cooking liquid travels. The way 18 is provided with a number of reaches which have not been shown in this application and the doughnut cutter forming a feature of the invention is attached to the machine in such a manner as to discharge the cut dough in one of the reaches of the way 18. The uppermost portion of the pan 15 has attached to it a table 19 which is supported on the frame members 14 and secured thereto. The cooking liquid is progressed through the way 18 of pan 15 by means of an impeller, not shown, which causes circulation of the cooking liquid through the machine and which causes the doughnuts deposited by the cutter to be progressed through the machine at the proper rate of speed. At a suitable position in the way 18 the doughnuts are turned over and at the end of the way the finished doughnuts are removed from the machine, all as disclosed in said application for patent of Peter J. Toews.

The case 10 has attached to it a bracket 21 which is constructed with a flange 22 extending along the rear wall 11 of said case and with a base 23 overlying the table 19 and frame member 14. The base 23, of bracket 21, rests upon a bar 24 overlying table 19 and is secured to the said bar and frame member by means of bolts 25. The flange 22, of bracket 21, is secured to the leg 13 of case 10 by means of a bolt 26 and a spacer 27. This bracket supports the cutter proper, which is indicated in its entirety by the reference numeral A, and the operating mechanism B by means of which said cutter is operated.

Formed on the base 23 are two bearings 28 and 29, in which is journaled a shaft 31. This shaft is driven in any suitable manner from the transmission of the device which is situated below the pan 15 and which has not been illustrated in the drawings. It can readily be comprehended that any drive means for rotating the shaft may be provided. Rotatably mounted on the shaft 31 is a sleeve 32 which carries all of the operating parts of the operating mechanism B which effect movement of the parts of the cutter and which will be presently more fully described. Sleeve 32 is constructed with a jaw clutch member 33, which is adapted to be engaged with another jaw clutch member 34 splined to the shaft 31. Any desired construction may be used for operating the jaw clutch member 34, a knob 35 being shown in the drawings.

The cutter A, best shown in Fig. 3, comprises a case or cylinder 36 constructed with a flange 37 issuing laterally from the same near its upper end. Cylinder 36 is provided with a cylindrical bore 38 forming a cylindrical chamber which is disposed with its axes vertical. Both ends of the cylinder 36 are open and the walls of the cylinder 36 are cut away on opposite sides to form slots 39 for a purpose to be presently more fully described.

Within the interior of the cylinder 36, is mounted a tube 41 which forms a support for parts of the cutter and which is considerably smaller than said cylinder and which is arranged concentric therewith. The tube 41 has a collar 42 encircling the same whose exterior diameter is exactly the same as the bore 38 of the cylinder 36. This collar is snugly received within the lower end of cylinder 36. By means of this construction the tube 41 is centered with reference to the cylinder.

The tube 41 is attached to the cylinder 46 by a construction, best shown in Figs. 4 and 5. At the lower end of the cylinder 36 are provided two bayonet slots 43 which are formed at their inner ends with counter-sinks indicated at 44. These slots are diametrically opposed and are disposed midway between the slots 39. To the collar 42 of tube 41 are attached two studs 45 which extend outwardly therefrom on opposite sides of the collar. These studs are adapted to be received within the bayonet slots 43 and may be moved to the ends of the slots to positions concentric with the counter-sinks 44. Threaded upon the studs 45, are nuts 46 which are formed with conical shoulders 47, adapted to fit into the counter-sinks 44. When these nuts are tightened up the collar 42 is held attached to the cylinder 36 and the tube 41 concentrically mounted within the bore 38 of the same.

The lower end of the tube 41 is provided with a tube extension which is indicated by the reference numeral 46 and which is larger in diameter. This tube extension is threaded at 40 to screw into the collar 42. The tube 41 is constructed with a central passageway 54 and the tube extension 46 is constructed with a passageway 55 which is larger in diameter than the passageway 54 and which gradually merges with the same. The lower end 47 of this tube forms a die element which cooperates with a disc-like head 48 to control the extrusion of dough from the cutter in annular formation. The head 48 is mounted on a stem 49 which is constructed at its other end with a threaded shank 51 adapted to screw into a boss 52 formed on a bridge 53. The bridge 53 is integral with or brazed to the interior of the tube extension 46 and preferably near the upper end thereof and serves to support the stem 49 and at the same time to conduct dough past the same, and into the passageway 55 within the interior of said tube extension.

Slidable upon the exterior of the tube extension 46 is a sleeve 56. This sleeve is constructed with a beveled annular edge 57 which is adapted to engage the head 48 and to sever portions of dough extruded through the outlet 58 between the said head and the lower end 47 of the tube extension 46. Sleeve 56 has a collar 59 to which are attached aligning diametrally opposed pins 61 by means of which the said sleeve may be reciprocated vertically along the tube extension 46.

Within the bore 38 of cylinder 36 is disposed a sleeve 61. This sleeve is adapted to reciprocate vertically and is formed at it supper end with a beveled edge 62 which forms one element of the inlet valve mechanism of the invention. This beveled edge is adapted to cooperate with a valve head 63 which is attached to a stem 64. Stem 64 is constructed with a threaded shank 65 which screws into a boss 66 formed on a bridge 67. Bridge 67 is integral with or brazed to the upper end of the tube 41, as shown, and serves to hold the head 63 centered, relative to the bore 68 of the sleeve 61 and at the same time provides a space 69 through which dough may enter the passageway 54. The tube 41 and the head 63 are stationary so that, as the sleeve 61 is raised, the same closes the passageway 69 between said head and the edge 62 of sleeve 61, closing the inlet valve mechanism. The sleeve 61 has secured to it, at diametrically opposed localities, two pins 71 which extend through the slots 39 in cylinder 36 and by means of which the sleeve 61 may be reciprocated.

Within the bore 68, of sleeve 61, is disposed an annular piston 72 which is, itself, constructed with a bore 73 which snugly receives the tube 41. This piston projects below the lower end of the sleeve 61 and has secured to it, at such locality, two pins 74. These pins also project through the slot 39 and serve to maintain the piston in proper position. The piston 72 travels from a position near the beveled edge 62 of sleeve 61 to a position in which the pins 74 are close to the collar 42 of tube 41.

Superimposing the cylinder 36 is a hopper 75 which is constructed with a throat 76 through which the dough, contained in the hopper, is directed into the passageway 69. At the lower most portion of the hopper 75 the same is constructed with a flange 77 which is bolted to the flange 37 of cylinder 36 by means of cap screws 78.

The operating mechanism B is best shown in Figs. 1 and 2. The flange 37 of cylinder 36 is constructed with a leg 79 which is provided with a foot 81, at the lower portion of the same. This foot rests upon a support 82 formed on the base 23 of bracket 21. These parts are secured together by means of bolts 83. Attached to the leg 79 are three studs 84, 85 and 86 which are situated one above the other. A lever 87 is pivoted on the stud 84. This lever consists of an arm 89 which carries, at its end, a roller 90 and further consists of a forked arm 91 at its other end which is constructed with split fingers 93, adapted to engage the pins 71 of sleeve 61. The roller 91 is adapted to engage a cam 94 fast on the sleeve 32. In a similar manner a lever 88 is pivoted on the stud 85 and constructed with an arm 95 which is provided with a cam roller 96. This lever is further constructed with a forked arm 97 having split fingers 98 at the ends of the same, adapted to engage the pins 74 of piston 72. The cam roller 96 engages a cam 105 fast on the sleeve 32. The stud 86 pivotally supports a lever 99 which is provided with an arm 101 terminating in a cam roller 103, which cam roller engages a cam 104 fast on the sleeve 32. Lever 99 is constructed with a forked arm 106 which is provided at its end with split fingers 107 adapted to engage the pins 61 of sleeve 56. A number of springs 109 are secured to hooks 108, attached to the support 46 and to the arms 89, 95 and 101 of levers 87, 88 and 99 and hold the cam rollers of said levers in contact with the various cams mounted on sleeve 32.

The operation of the invention is as follows: The cam 105 is constructed with a rapidly spiralling surface 111, a gradually spiralling surface 112 and cylindrical surfaces 113 and 114 therebetween. Shaft 31 rotates, as indicated by the arrow in Fig. 2. When the roller 96 travels along the surface 112, dough is gradually drawn into the interior of the sleeve 62, the piston 72 moving downwardly. The two cams 94 and 104 are so designed that, when the piston 72 is moving downwardly, the sleeve 56 and the sleeve 61 are in the position shown in Fig. 3. In such position dough travels through the passageway 69 from hopper 75 and into the interior of the dough cutter. When the piston 72 reaches the lowermost portion of its stroke, sleeve 61 and sleeve 56 are both raised, which closes the passageway 69 and opens the passageway 58. The piston 72 then travels upwardly. This is procured by the roller 96, following along the surface 111 of cam 105 which is brought about through the action of the spring 109, attached to lever 88. During such movement dough is forced through the passageways 54 and 55 and caused to discharge through the outlet 58. When the piston 72 reaches the uppermost position, sleeve 56 is next lowered through the action of cam 104, which is accomplished as quickly as possible. Thereafter sleeve 61 is lowered, whereupon the cycle of operations is repeated.

When it is desired to clean the machine, the springs 109 are first disengaged from the levers with which they act. Thereafter the entire cutter may be removed by unloosening the bolts 83. By next unloosening the nuts 46, the sleeve 41 and the extension 46, attached thereto, may be rotated and slid longitudinally to disengage the studs 45 from the bayonet slots 43. Thereafter the entire assembly, including sleeves 61 and piston 72, may be slid out of the cylinder 36 and the same immersed in water and cleaned. Both the head 48 and the valve 63 may be removed by unscrewing and likewise the tube extension 46 so that all of the parts are readily taken apart after removal from the cutter.

The advantages of my invention are manifest. An extremely simple and practical construction is provided by means of which uniform dough extrusions may be procured. At the locality of entrance of the dough into the annular cylinder chamber no bridge or other supporting structure is present, so that there is a minimum amount of resistance to the entry of dough into such chamber. Also the annular cylindrical chamber extends up to the passageway from the hopper so that the dough travels a minimum length in arriving into the cylinder chamber. By the use of a sleeve valve, in conjunction with a fixed valve head, a minimum amount of dough displacement occurs in closing the valve.

Changes in the specific form of my invention, as herein disclosed, may be made within the scope of what is claimed without departing from the spirit of my invention.

Having described my invention, what I claim as new and desire to protect by Letters Patent is:

1. A dough cutter comprising a vertical cylinder a tube within said cylinder of lesser diameter than said cylinder and having a collar fitting within said cylinder at its lower end and centering said tube within said cylinder, an annular piston disposed between said cylinder and tube, valve means at the upper end of said cylinder for controlling the intake of dough into said tube and means at the lower end of said tube for controlling the extrusion of dough therefrom.

2. A dough cutter comprising a vertical cylinder, a support within said cylinder, means on said support engaging said cylinder near the lower end thereof and holding said support in position within said cylinder, piston means for drawing dough into said cylinder, valve means at the upper end of said cylinder for controlling the travel of dough into said cylinder, said valve means including a stationary valve member, said member being carried by said support and means for controlling the extrusion of dough from said cylinder.

3. A dough cutter comprising a case, a vertical tubular support within said case, means on said support engaging said case near the lower end thereof and holding said support in position within said case, piston means for drawing dough into said case and discharging it into said tubular support, a bridge extending across said support, a valve stem attached to said bridge, a valve head carried by said stem and being disposed near the upper end of said case, a sleeve cooperating with said valve head for controlling the entry of dough into said case and means at the end of said tubular support for controlling the extrusion of dough therefrom.

4. A dough cutter comprising a vertical cylinder open at its upper end, a sleeve valve member reciprocable within said cylinder, an annular piston reciprocable within said sleeve, a tubular support within said piston and along which said piston slides, means attached to said tubular support and said cylinder at a locality below said piston for holding said tube in position within said cylinder, a valve head carried by said tubular support and extending above said piston, said sleeve cooperating therewith to control the passage of dough into the tubular support and means at the lower end of the tube for controlling the extrusion of dough therefrom.

5. A dough cutter comprising a vertical cylinder open at its upper end, a sleeve valve member reciprocable within said cylinder, an annular piston reciprocable within said sleeve valve member, a tubular support within said piston and along which said piston slides, a collar on said tubular support of the same diameter as said cylinder and received within the lower end thereof, means for detachably securing said collar to said cylinder, a valve head carried by said tubular support and extending above said piston, said sleeve cooperating with said valve head to control the passage of dough into tubular support and means at the end of said tubular support for controlling the extrusion of dough from the same.

6. A dough cutter comprising a vertical cylinder open at the lower portion thereof, slots extending on opposite sides of said cylinder and opening through the lower end of the same, a piston within said cylinder and operating means for said piston extending through said slot, said piston being removable from said case through downward movement of said operating means through the open ends of the slots.

7. A dough cutter comprising a vertical cylinder open at the lower portion thereof, slots extending on opposite sides of said cylinder and opening through the lower end of the cylinder, a valve member within said cylinder and operating means for said valve member extending through said slots, said valve member being removable from said case through downward movement of said operating means through the open ends of the slots.

8. A dough cutter comprising a case having a chamber within the same open at its upper and lower ends, valves at the upper and lower ends of said chamber for controlling the passage of dough into and out of the chamber, said valves including sleeve members disposed at the upper and lower portions of the case and spaced from one another and stationary valve members cooperating therewith, means for supporting said stationary valve members at a locality intermediate said sleeves and means for drawing dough into and ejecting dough from said chamber.

9. A dough cutter comprising a case having a chamber within the same open at its upper and lower ends, valves at the upper and lower ends of said chamber for controlling the passage of dough into and out of the chamber, said valves including movable valve members disposed at the upper and lower end of the case and spaced from one another and stationary valve members cooperating therewith, means for supporting said stationary valve members relative to said case at a locality between said movable valve members and means for drawing dough into and ejecting dough from said chamber.

10. A dough cutter comprising a case having a chamber within the same open at its upper and lower ends, valves at the upper and lower ends of said chamber for controlling the passage of dough into and out of the chamber, said valves including movable valve members disposed at the upper and lower ends of the case and spaced from one another and stationary valve members cooperating therewith, a removable support, said stationary valve members being carried by said support and cooperating with said movable valve members and means for detachably attaching said support to said case at a locality between said movable valve members.

ALEXANDER S. T. LAGAARD.